United States Patent [19]
Koenck

[11] Patent Number: 5,673,999
[45] Date of Patent: Oct. 7, 1997

[54] LCD BACKLIGHTING METHOD AND APPARATUS USING A XENON FLASH TUBE INCLUDING DRIVE CIRCUIT

[75] Inventor: Steven E. Koenck, Cedar Rapids, Iowa

[73] Assignee: Norand Corporation, Cedar Rapids, Iowa

[21] Appl. No.: 464,536

[22] Filed: Jun. 5, 1995

Related U.S. Application Data

[63] Continuation-in-part of Ser. No. 353,880, Dec. 12, 1994, abandoned, and a continuation-in-part of Ser. No. 417,042, Apr. 4, 1995.

[51] Int. Cl.[6] ............................................. G02F 1/1335
[52] U.S. Cl. .......................... 362/263; 362/255; 362/330; 349/64
[58] Field of Search .................................. 362/26, 29, 30, 362/31, 263, 265, 330, 255, 84; 359/48, 49; 349/64, 61

[56] References Cited

U.S. PATENT DOCUMENTS

| 4,842,378 | 6/1989 | Flasck et al. | 362/31 |
| 4,845,596 | 7/1989 | Mouissie | 362/32 |
| 5,099,343 | 3/1992 | Margerum et al. | 362/84 |
| 5,136,480 | 8/1992 | Pristash et al. | 362/32 |
| 5,187,765 | 2/1993 | Muehlemann et al. | 362/32 |

*Primary Examiner*—Ira S. Lazarus
*Assistant Examiner*—Sara Sachie Raab
*Attorney, Agent, or Firm*—Suiter & Associates PC

[57] ABSTRACT

An liquid-crystal display panel is illuminated by one or more xenon flash tubes as a backlighting source. The LCD backlight includes a back reflector, a reflecting cavity, and a light diffuser. The LCD panel is illuminated by triggering a flash of light from the xenon flash tube at a given frequency, reflecting the flash of light off of a back reflector, and diffusing the flash of light through a light diffuser. Flash lamp drive circuitry controls the triggering of a flash of light from a xenon flash lamp.

54 Claims, 5 Drawing Sheets

5,673,999

LCD BACKLIGHTING METHOD AND APPARATUS USING A XENON FLASH TUBE INCLUDING DRIVE CIRCUIT

CROSS-REFERENCE TO RELATED APPLICATIONS

The present invention is a continuation-in-part of U.S. application Ser. No. 08/353,880 filed Dec. 12, 1994, abandoned. Said application Ser. No. 08/353,880 is hereby incorporated herein by reference in its entirety.

The present application is also a continuation-in-part of copending U.S. application Ser. No. 08/417,042 filed Apr. 4, 1995, pending.

TECHNICAL FIELD

The invention relates generally to lighting sources for video displays and specifically to illumination of a liquid-crystal display panel.

BACKGROUND OF THE INVENTION

Video display systems of portable data terminals commonly employ liquid-crystal displays. Technological advances in electronics have resulted in the ability to place powerful computer hardware into smaller sized portable data terminals. Along with the advances in computer hardware have come leaps in the capabilities of liquid-crystal displays which have been symbiotically integrated with reduced sized portable data terminals. Liquid-crystal displays have extremely low current requirements and therefore consume little power making them ideal for display systems in battery powered portable data terminals.

Liquid-crystals act as light shutters and therefore need an accompanying light source to produce the luminosity required to view the information on the display. LCDs commonly employ an electroluminescent backlighting panel in order to produce the necessary display lighting. Electroluminescent backlight panels operate at high voltages and consume a large portion of the onboard available battery power of the portable data terminal.

The utilization of electroluminescent backlight panels has always been considered a necessary evil even though engineers must undertake extensive design efforts to generate the correct voltages to drive the electroluminescent backlight panel and to minimize the power consumed. Complex drive circuits for the electroluminescent panels in the prior art require inversion of the direct current voltage supplied by the battery and often include transformers or other inductive devices in conjunction with the high inherent capacitance and resistance which electroluminescent display panels exhibit. Great lengths are undertaken to progressively charge the electroluminescent panel and accompanying resonant tank circuits in order to store electrical energy that will be utilized to drive the electroluminescent panel in subsequent charge cycles. The reason that such great lengths are taken to reduce the power consumption of the electroluminescent backlight is that it is responsible for approximately 40 percent of the power consumption in a portable data terminal.

Another problem encountered with electroluminescent panels is that multiple phosphor materials are used to produce white light which contains all wavelengths of visible light. The problem is that phosphors emit blue and green wavelengths of light more efficiently than red or yellow wavelengths of light resulting in a color imbalance. A solution to this problem is subtractive filtering where a pinkish colored filter is used to attenuate the blue and green light thereby approximating a white light spectrum. However this method further reduces the efficiency of the electroluminescent panel by reducing the intensity of the light so fruitfully produced.

An alternative lighting source for the illumination of an LCD panel of greater power efficiency than current electroluminescent panels would greatly benefit battery operated portable data terminals. Greater power efficiency of the lighting device means less battery energy is consumed resulting in longer battery life. Additionally complex electroluminescent device drive circuitry would no longer be required.

Several methods of LCD panel backlighting have been attempted. Incandescent light bulbs are too inefficient and emit a large portion of the energy used as heat. Light emitting diodes (LEDs) have also been used to backlight LCD panels, but, while more efficient than incandescent bulbs, LEDs also generate too much heat. Electroluminescent panels exhibit relatively low thermal output and as thus are considered a "cold light" technology, yet EL technology has its disadvantages.

Flash tubes containing xenon, an inert gas, are well known in the art. Xenon flash tubes have been typically employed as the pulsed light source in the applications of stroboscopy, high-speed photography and high-speed cinematography. Xenon flash tubes are capable of producing an extremely brilliant incoherent light of high luminance and flux from a relatively small sized device. The spectrum of light emitted from a xenon flash tube is nearly continuous white actinic light and thus produces good color registration and balance. Flash tubes filled with xenon gas may attain considerable luminous efficiency on the order of 25–50 lumens per watt. Xenon flash tubes exhibit low thermal output and are thus considered a "cold lamp" technology.

Recently developed xenon bulbs have been utilized in optical scanner devices. The light from the xenon lamp will not attenuate with age thereby having a consistent and stable output over time. A xenon lamp can be designed to never burn out. The xenon lamp is capable of producing pulses of light that last as briefly as 1 μs or less having a peak luminance on the order of 10 kilostilbs to 200 megastilbs. The luminous efficiency of the xenon bulb may be increased with an increase in the electrical energy applied. Although there are numerous applications of xenon flashbulbs, the prior art does not teach using a xenon flash tube as the lighting source of a liquid-display panel.

OBJECTS OF THE INVENTION

It is therefore an object of the invention to reduce the power consumption of the video display of a portable data terminal by utilizing a new illumination method and apparatus.

It is another object of the invention to utilize a xenon flash tube to provide illumination of a liquid-crystal display panel.

Additional objects, advantages and novel features of the invention will become apparent to those skilled in the art upon examination of the specification and drawings and may be learned by practice of the invention. The objects and advantages of the invention may be realized and attained by means of the instrumentalities and combinations particularly pointed out in the claims.

BRIEF DESCRIPTION OF THE DRAWINGS

FIG. 7 is a schematic diagram of a circuit for driving a xenon flash tube.

DESCRIPTION OF AN EXEMPLARY EMBODIMENT

Figure 1:
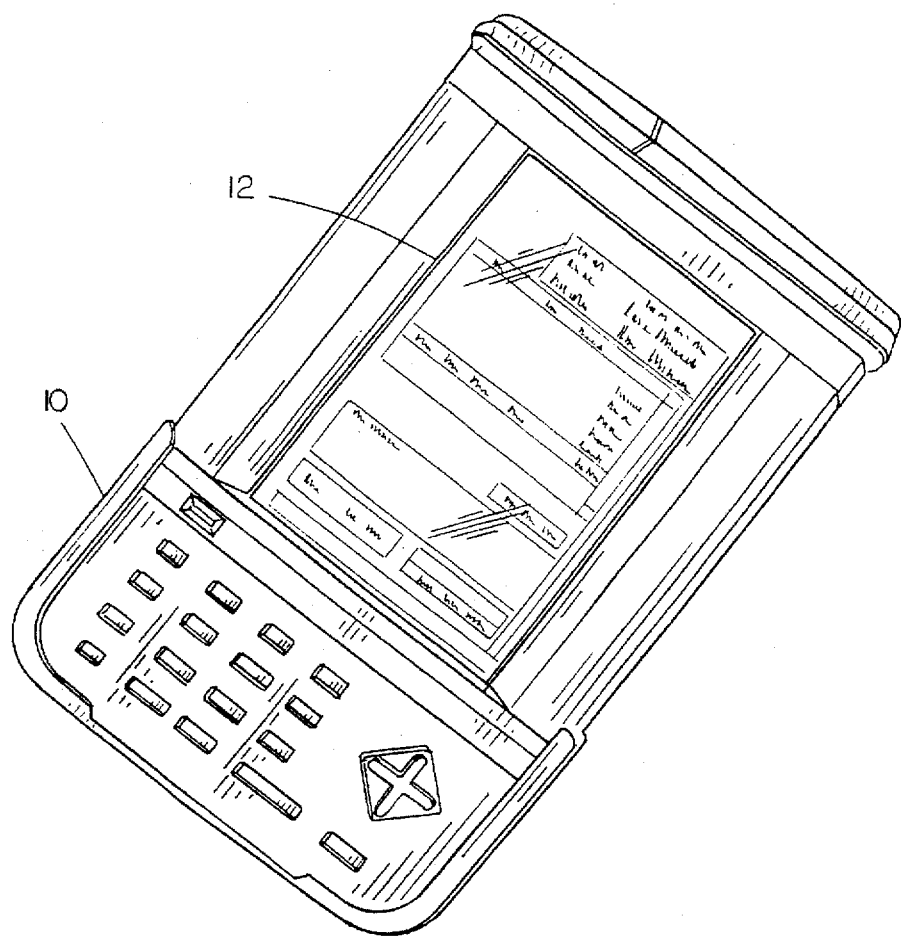
FIG. 1 is an illustration of a typical portable data terminal in which the invention may be implemented.

FIG. 1 shows a typical hand held portable data terminal 10 which is an ideal candidate for the present invention. A terminal such as the one shown is powered by a rechargeable battery and therefore low power consumption of its internal components is necessary in order to maximize the life of the battery. Having a relatively large display 12 requires that the LCD backlighting source generates light of high luminosity and flux density. Often a terminal of this sort is employed in a building which may have poor lighting making the light output all the more important. Therefore a hand held portable data terminal could greatly benefit from a video display light source capable of producing large amounts of light across the entire spectrum of visible light.

Figure 2:
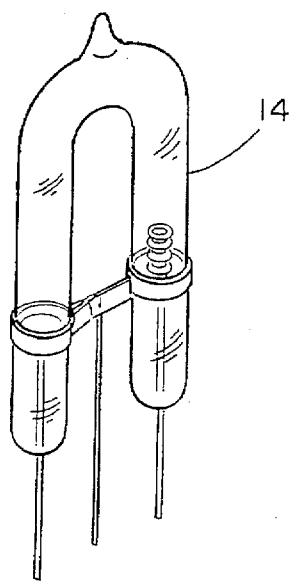
FIG. 2 is an portrayal of a type of xenon flash tube.

FIG. 2 depicts one sort of electric lamp 14 that is capable of producing an extremely brilliant white light. This particular lamp 14 is U-shaped and contains xenon, an inert gas. Xenon flash lamps are characteristically stable in operation and because of the brief deionization times of inert gases are capable of producing flashes of frequencies of up to 2,500 flashes per second, or 2.5 kHz. In an exemplary embodiment of an LCD backlighting system, the lamp 14 flashes at 60 Hz to 70 Hz, which is faster than can be noticed by the human eye thus appearing to produce a continuous light output. An available xenon lamp is less prone to flickering than standard fluorescent lights, experiences no reduction in light output over time, produces excellent color balance and can be designed to never burn out.

Figure 3:
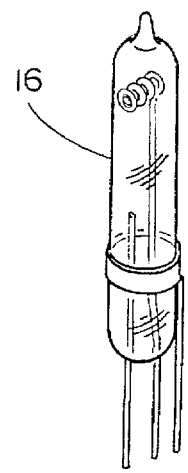
FIG. 3 is a portrayal of another type of xenon flash tube.

FIG. 3 depicts another sort of electric lamp 16 also containing xenon gas. This tube is constructed with a straight light capillary tube rather than a U-shaped tube. It exhibits illumination properties similar to the xenon flash tube of FIG. 2. Since this xenon flash tube 16 is smaller in volume than the xenon flash tube 14 of FIG. 2, its light output is of lower luminosity and flux density.

Figure 4:
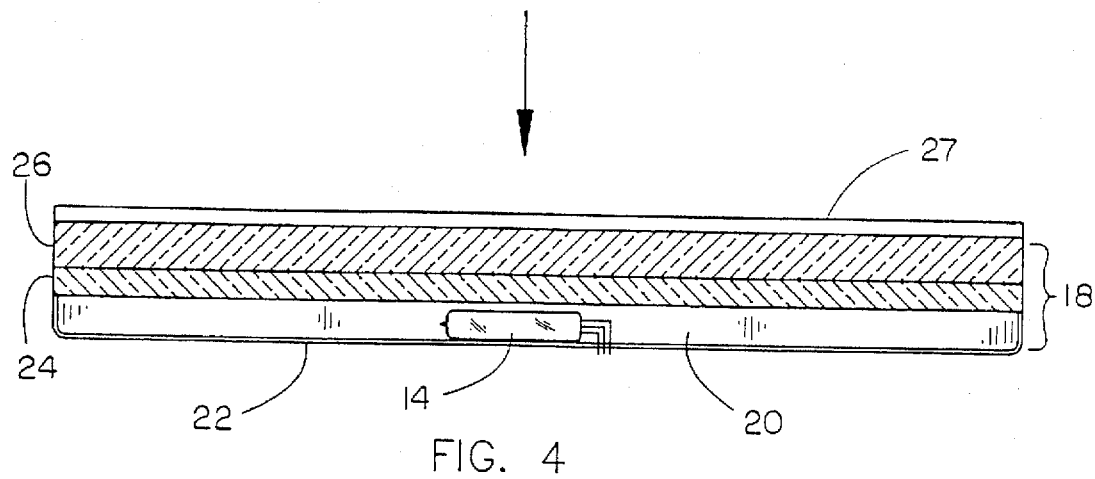
FIG. 4 is depicts an embodiment of an LCD backlighting method using a xenon flash tube.

FIG. 4 is a side view illustration of one embodiment of a backlight for an LCD video display 18. A xenon flash tube 14 of the type illustrated in FIG. 2 is mounted in a reflecting cavity 20 constructed as the rear side of the display 18. The back reflector 22 constructed at the rear of the reflecting cavity 20 is fabricated from a metallic or similar substance having mirror-like light reflecting properties such that photons emitted radially from the xenon flash tube 14 will be directed to travel generally in a direction parallel to a line normal to the plane of the LCD panel 26.

A diffuser layer 24 is interposed at the interface between the reflecting cavity 24 and the LCD panel 26. The diffuser layer 24 may be a flexible diffuser material, a plastic geometric diffuser, a woven fiber optic diffuser, or the like capable of further scattering the light directly incident from the xenon flash tube 14 and light reflected off of the back reflector 22. Light scattered by the diffuser layer 24 will have an even flux density distribution across the entire area of the LCD panel 26 such that the change of flux density across the panel 26 is approximately zero.

In an alternative embodiment the diffuser layer 24 may be supplemented with or replaced by a layer of fluorescent material, a phosphorescent material or the like to produce various lighting conditions. Additional layers 27 such as layers of light filtering material or digitizing screen layers could be incorporated into the display panel 18 as desired. Additional layering will not cause any significant reduction in the viewability of the display 18 because of the high luminosity and flux density of the output from the xenon flash tube 14.

Figure 5:
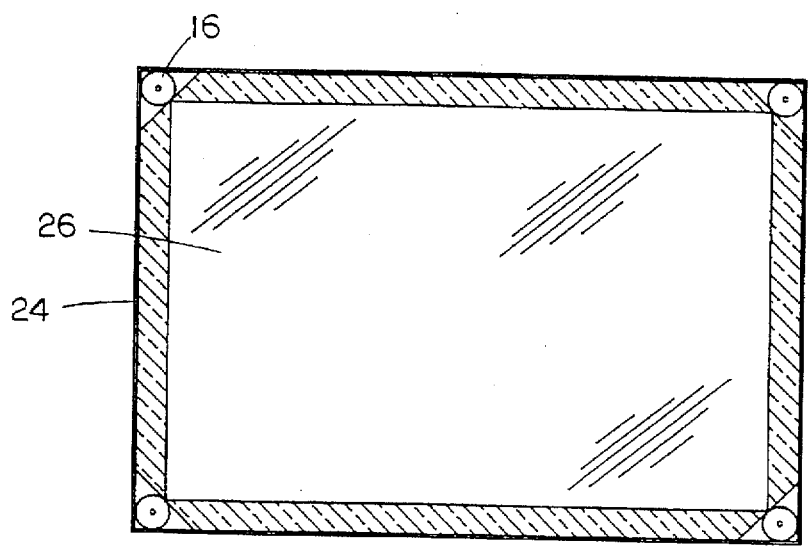
FIG. 5 is a top view illustration of another embodiment of an LCD lighting method using four xenon flash tubes.

FIG. 5 shows a top view illustration of an alternative embodiment of an LCD backlight. Four xenon flash tubes 16 of the type illustrated in FIG. 3 are positioned at each of the four corners of the LCD panel 26. The diffuser layer 24 is positioned beneath the LCD panel 26 to scatter the photons emitted from the xenon flash tubes 22 in a manner similar to that previously described and is constructed of similar material.

The back reflector 22 is also fabricated of a material similar to that previously described. The reflector 22 surrounds the perimeter of the diffuser material 24 to contain and reflect photons back into the diffuser 24. This embodiment may provide for better flux density distribution of the produced light.

Figure 6:
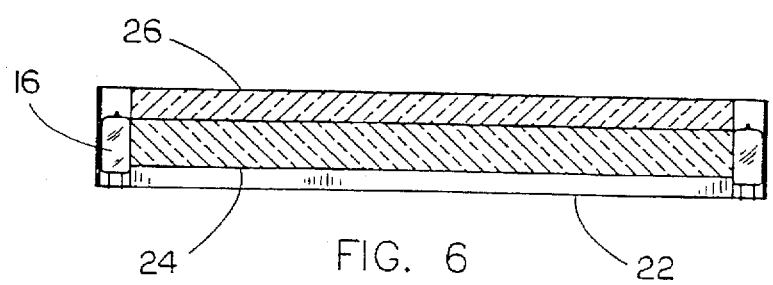
FIG. 6 is a side view illustration of the embodiment depicted in FIG. 5.

FIG. 6 is a side view illustration of the embodiment of FIG. 5. The reflector 22 surrounds the xenon flash tubes 16 on the sides bottom and top for maximum reflection of the emitted photons into the diffuser layer 24. A reflecting cavity 20 may exist beneath the diffuser layer 24 to reflect incident thereupon directly from the xenon flash tubes 16 in order to augment light intensity near the center of the display 18.

FIG. 7 depicts the circuitry used to drive a xenon flash tube. A DC to DC converter 28 ("DC—DC CONV") increases the voltage from the battery power source to a high level voltage. The DC to DC converter 28 connects to a shunting capacitor 30 ("C1") used to charge the xenon flash tube 36 ("Xe") at the desired driving frequency through a series connected resistor 32 ("R"). A second capacitor 34 ("C2") shunts the xenon flash tube 36 for storage of the electrical energy discharged from the xenon flash tube 36.

A trigger electrode 38 connects to the output terminal of a drive transformer 42 ("TRANSFORMER") and controls the emission of light from the xenon flash tube 36. Trigger drive circuitry 40 ("TRIGG DRIVE") produces an impulse voltage through the drive transformer 42 to the trigger electrode 38 in order to trigger a pulse of light from the xenon flash tube 36.

Figure 8:
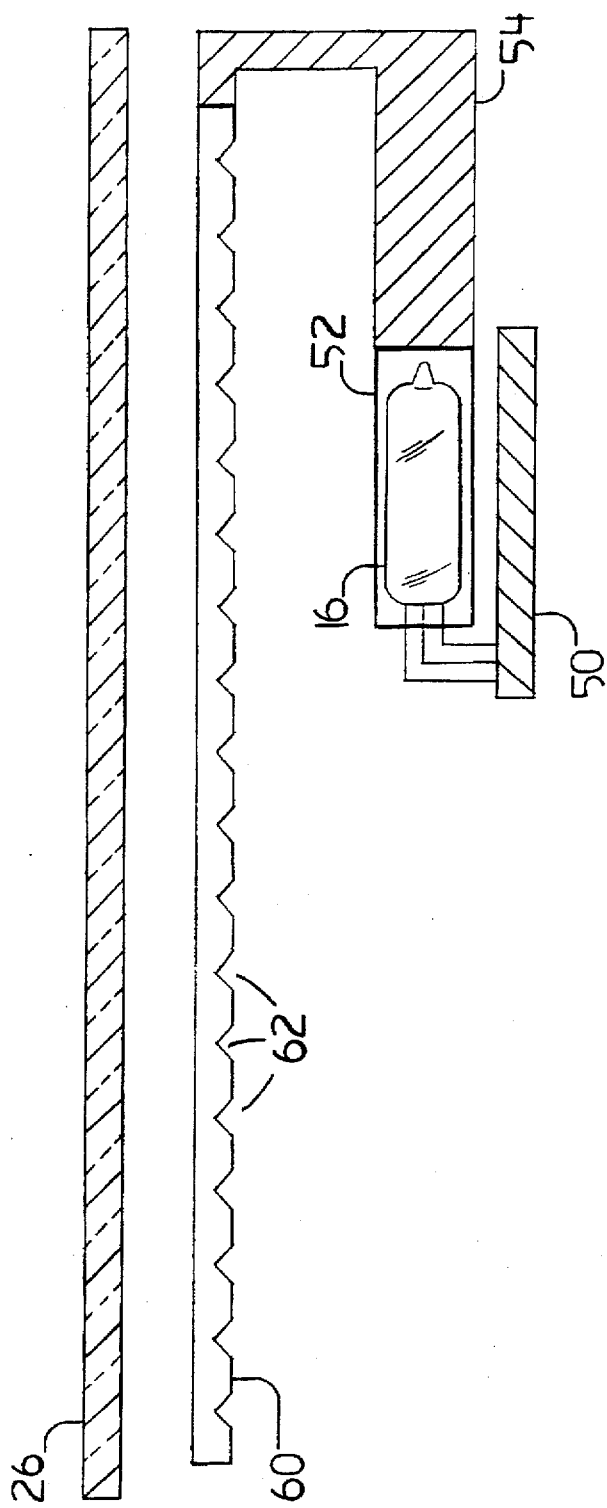
FIG. 8 is an illustration of an alternative embodiment of the present invention.
Figure 8:
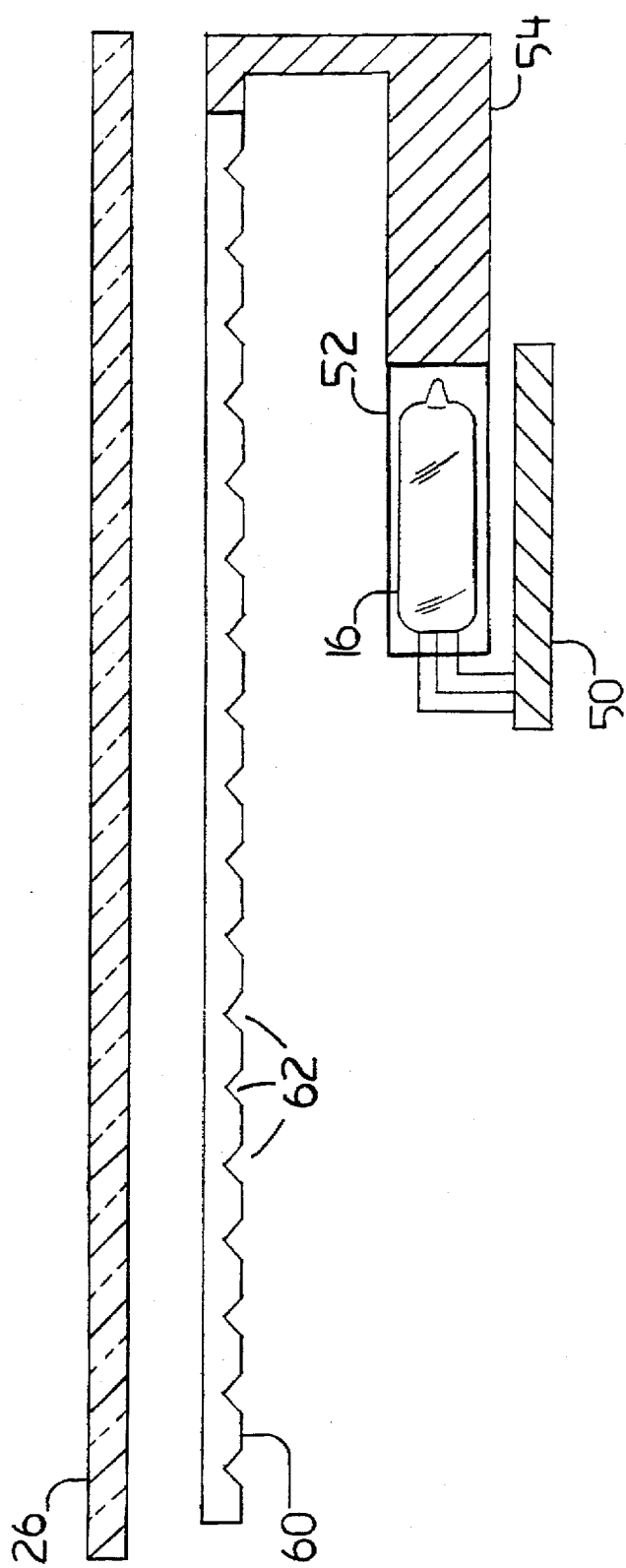

FIG. 8 depicts an alternate structure and method for directing the illumination from a xenon flash tube to be utilized as backlighting for an LCD panel. A standard type LCD panel 26 may require backlight illumination in order to be properly illuminated for viewing. Illumination of the LCD panel 26 may be provided a by a xenon flash tube 16 substantially similar to the flash tubes 14 and 16 shown in FIGS. 2 and 3. The xenon flash tube 16 is preferably mounted on a printed circuit board 50 which may also contain the flash drive circuitry of FIG. 7, for example. A xenon flash tube 16 is utilized as a light source because of the inherent advantages which a xenon light tube provides such as improved light generation efficiency over other light sources. For example, a xenon flash tube produces much less heat for a given light output than an LED light source and is thereby more efficient.

The xenon flash tube 16 may be enveloped in a shrink sleeve 52 which completely encloses the xenon flash tube 16 and whose interior surface may comprise a metallic or similar mirror-like material in order to reflect the light output from the flash tube into a fiber optic bundle 54. The fiber optic bundle 54 is used to capture the light emissions from the xenon flash tube 16 to be transmitted into a light diffuser panel 60. The light diffuser panel 60 receives light from the fiber optic bundle 54 and redirects the light to be emitted from a planar face of the light diffuser panel 60 toward the LCD panel 26. The light diffuser panel 60 may have, for example, a plurality of quadratically shaped surfaces 62, which may be pyramidal-shaped notches for example, on the side facing away from the LCD panel 26 in order to redirect the light toward the LCD panel 26 from the side of the light diffuser panel 60 which faces the LCD panel 26. The light diffuser panel 60 may also utilize the efficient electroluminescent light source for backlighting a liquid crystal display as disclosed in U.S. application Ser. No. 08/417,042 filed Apr. 14, 1995 and assigned to the assignee of the present application.

Figure 9:
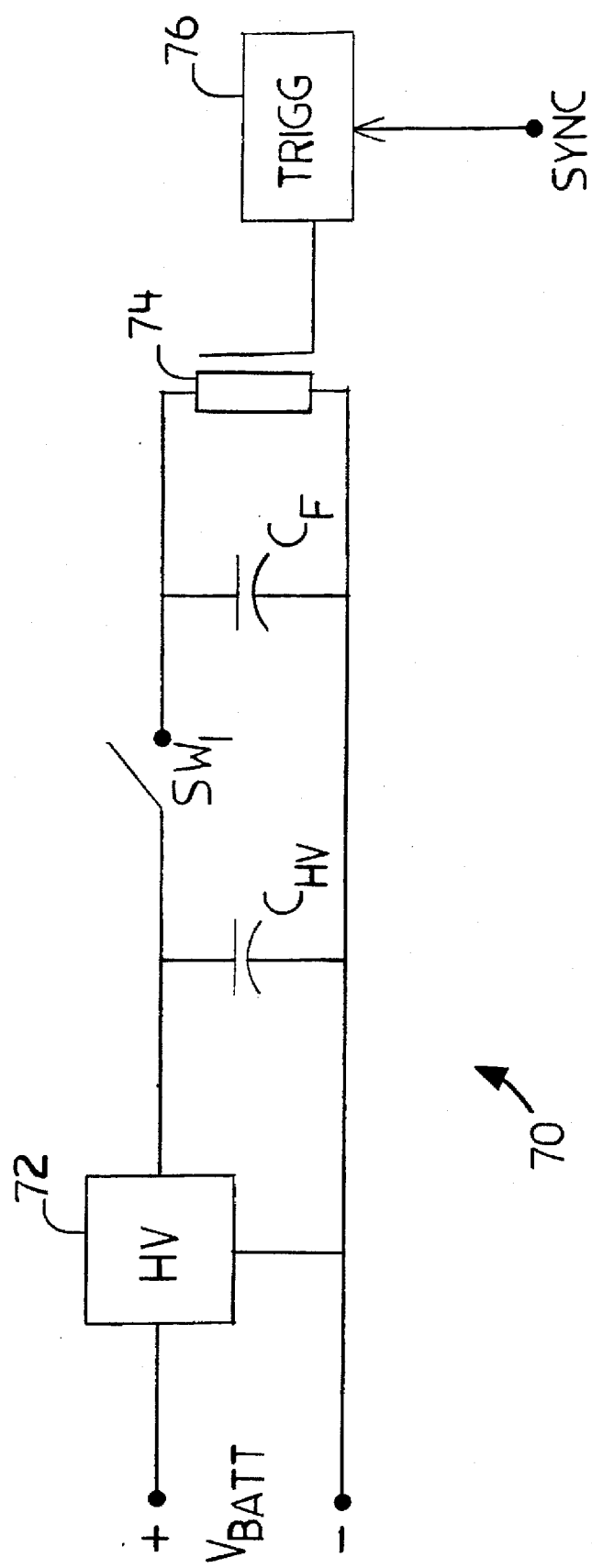
FIG. 9 is a schematic diagram of an alternative drive circuit of the present invention.

FIG. 9 is a schematic diagram of an alternative xenon flash tube drive circuit 70 for the present invention. A high voltage DC-to-DC converter ("HV") 72 is preferably utilized to increase the voltage from the battery power source ("VBATT") to a high level voltage which the xenon flash tube 74 requires. The high voltage converter 72 connects to a high voltage shunting capacitor ("CHV") to charge the xenon flash tube 74 at the desired driving voltage and frequency through a series connected charge control switch ("SW1"). The switch may be an electrically controlled power MOSFET switch, for example. A second flash discharge capacitor ("CF") shunts the xenon flash tube 74 for storage of the electrical energy to be discharged into the xenon flash tube 74.

A flash tube trigger drive circuit ("TRIGG") 76 triggers and controls the emission of light from the xenon flash tube 74. The flash tube trigger drive circuit 76 produces an impulse voltage to the xenon flash tube 74 in order to trigger the emission of light from the xenon flash tube 74. In a preferred embodiment of the present invention, the flash tube trigger drive circuit 74 is synchronized with the refresh rate of the LCD panel 26 as shown in FIG. 8 such that the illumination of the LCD panel 26 substantially coincides with display of information on the LCD panel 26. The flash tube trigger drive circuit 76 may receive an LCD sync input signal ("SYNC") in order to accomplish the synchronization of the triggering of the xenon flash tube 74 with the refresh rate of the LCD panel 26.

It will be apparent that many modifications and variations may be effected without departing from the teachings and concepts of the present disclosure.

What is claimed is:

1. An apparatus for backlighting and illuminating a flat panel display having a planar surface wherein said flat panel display is utilized as a means for displaying data in a hand-held portable data terminal, said apparatus comprising:

(a) a flashtube for providing a light output to the flat panel display generally across the planar surface thereof, said flashtube containing primarily an inert gas and providing a nearly continuous white, incoherent light output;

(b) means interposed between said flashtube and the flat panel display for evenly distributing and diffusing the light output of said flashtube across the planar surface of the flat panel display such that the light output of said flashtube illuminates the flat panel display with a substantially even flux density distribution; and (c) means, operatively connected to said flashtube, for electrically driving said flashtube wherein the light output of said flashtube is operatively controlled therewith.

2. The apparatus of claim 1 further comprising reflecting means disposed adjacent to the flat panel display for redirecting the light output of said flashtube through said light distributing and diffusing means and through the flat panel display.

3. The apparatus of claim 1 wherein the inert gas is xenon.

4. The apparatus of claim 1 wherein said light distributing and diffusing means comprises a flexible diffuser material.

5. The apparatus of claim 1 wherein said light distributing and diffusing means comprises a geometric diffuser material.

6. The apparatus of claim 1 wherein said light distributing and diffusing means comprises a woven fiber optic diffuser material.

7. The apparatus of claim 1 wherein said light distributing and diffusing means comprises a fluorescent material.

8. The apparatus of claim 1 wherein said light distributing and diffusing means comprises a phosphorescent material.

9. The apparatus of claim 1 further comprising light filtering means disposed upon the flat display panel for spectrally altering of the light output of said flashtube.

10. The apparatus of claim 1 further comprising a digitizing screen layer disposed upon the flat display panel.

11. The apparatus of claim 1 wherein said means for electrically driving said flashtube comprises:

(a) a DC—DC converter means having an output for providing an output voltage to said flashtube in response to an input voltage from a direct current voltage source, the output voltage being greater than the input voltage;

(b) a resistor having first and second ends, said resistor being electrically connected in series with said DC—DC converter means and said flashtube;

(c) a first capacitor shunting the output of said DC—DC converter means at the first end of said resistor;

(d) a second capacitor shunting the output of said DC—DC converter at the second end of said resistor;

(e) a drive circuit means for providing an impulse voltage to the trigger electrode of said flashtube wherein said flashtube produces light when triggered by said drive circuit means; and (f) a transformer means electrically connected between said drive circuit means and said flashtube.

12. The apparatus of claim 11 wherein the direct current voltage source is a battery.

13. The apparatus of claim 1 further comprising a shrink sleeve encompassing said flashtube, said shrink sleeve having a reflective inner surface for directing the light output of said flashtube into said light distributing and diffusing means.

14. The apparatus of claim 1 wherein said light distributing and diffusing means includes a fiber optic bundle for transferring the light output from said flashtube to the flat panel display.

15. The apparatus of claim 1 wherein said light distributing and diffusing means includes a plurality of quadratically shaped surfaces for distributing and diffusing light across the flat panel display.

16. The apparatus of claim 1 further comprising means disposed upon the flat panel display for polarizing the light output of said flashtube.

17. The apparatus of claim 1 further comprising means for synchronizing said flashtube at the same rate at which said flat panel display is refreshed.

18. An apparatus for backlighting an LCD panel, said apparatus comprising:
   (a) a liquid-crystal display panel;
   (b) at least one flashlamp for producing light, said at least one flashlamp being disposed adjacent to said liquid-crystal display panel for providing illumination thereof, wherein said flashlamp contains xenon:
   (c) a diffuser means for altering the flux density of the light produced by said at least one flashlamp such that the light diffused therefrom is evenly distributed across said liquid-crystal display panel, said diffuser means being disposed between said liquid-crystal display panel and said at least one flashlamp;
   (d) a reflector means for altering the direction of light produced by said at least one flashlamp, said reflector means being disposed adjacent to said at least one flashlamp such that the light reflected therefrom is directed toward said liquid-crystal display panel; and
   (e) a circuit means electrically connected to said at least one flashlamp for triggering flashes of light from said at least one flashlamp such that light is thereby produced.

19. The apparatus of claim 18 wherein said at least one flashlamp is a U-shaped tube.

20. The apparatus of claim 18 wherein said at least one flashlamp is a straight light capillary tube.

21. The apparatus of claim 18 wherein said reflector means is a metallic reflector.

22. The apparatus of claim 18 wherein said reflector means is a mirror.

23. The apparatus of claim 18 wherein said reflector means is a light-reflective plastic.

24. The apparatus of claim 18 wherein the light reflected from said reflector means is directed toward said liquid-crystal display panel at an angle generally normal to said liquid-crystal display.

25. The apparatus of claim 18 wherein said diffuser means comprises a flexible light diffuser material.

26. The apparatus of claim 18 wherein said diffuser means comprises a plastic geometric diffuser material.

27. The apparatus of claim 18 wherein said diffuser means comprises a woven fiber optic diffuser material.

28. The apparatus of claim 18 wherein said diffuser means comprises a fluorescent material.

29. The apparatus of claim 18 wherein said diffuser means comprises a phosphorescent material.

30. The apparatus of claim 18 further comprising a light filtering means disposed upon said liquid-crystal display for providing color balance to the light produced by said at least one flashlamp.

31. The apparatus of claim 18 further comprising a digitizing screen layer disposed upon said liquid-crystal display.

32. The apparatus of claim 18 wherein said at least one flashlamp includes a trigger electrode.

33. The apparatus of claim 32 wherein said circuit means comprises:
   (a) a DC—DC converter means having an output for providing an output voltage to said at least one flashlamp in response to an input voltage from a direct current voltage source, the output voltage being greater than the input voltage;
   (b) a resistor having first and second ends, said resistor being electrically connected in series with said DC—DC converter means and said at least one flashlamp;
   (c) a first capacitor shunting the output of said DC—DC converter means at the first end of said resistor;
   (d) a second capacitor shunting the output of said DC—DC converter means at the second end of said resistor;
   (e) a drive circuit means for providing an impulse voltage to the trigger electrode of said at least one flashlamp wherein said at least one flashlamp produces light when triggered by said drive circuit means; and
   (f) a transformer means electrically connected between said drive circuit means and said at least one flashlamp.

34. The apparatus of claim 33 wherein the direct current voltage source is a battery.

35. A method of backlighting an LCD panel comprising:
   (a) triggering a flash of light from a xenon light source at a given frequency;
   (b) reflecting said flash of light off of a reflector disposed adjacent to the xenon light source;
   (c) diffusing said flash of light through a light diffuser, the light diffuser receiving light directly incident from the xenon light source and light reflected off of the reflector; and
   (d) illuminating a liquid-crystal display, the liquid-crystal display being adjacent to the light diffuser and receiving the light diffused therefrom.

36. The method according to claim 35 wherein said flash of light is triggered from the xenon light source at a frequency of 60 to 70 Hz.

37. An apparatus for backlighting an LCD panel, said apparatus comprising:
   (a) a liquid-crystal display panel;
   (b) at least one flashlamp for producing light, said at least one flashlamp being disposed adjacent to said liquid-crystal display panel for providing illumination thereof, wherein said flashlamp contains xenon;
   (c) a diffuser for altering the flux density of the light produced by said at least one flashlamp such that the light diffused therefrom is evenly distributed across said liquid-crystal display panel, said diffuser being disposed between said liquid-crystal display panel and said at least one flashlamp;
   (d) a reflector for altering the direction of light produced by said at least one flashlamp, said reflector being disposed adjacent to said at least one flashlamp such that the light reflected therefrom is directed toward said liquid-crystal display panel; and
   (e) a circuit electrically connected to said at least one flashlamp for triggering flashes of light from said at least one flashlamp such that light is thereby produced.

38. The apparatus of claim 37 wherein said at least one flashlamp is a U-shaped tube.

39. The apparatus of claim 37 wherein said at least one flashlamp is a straight light capillary tube.

40. The apparatus of claim 37 wherein said reflector is a metallic reflector.

41. The apparatus of claim 37 wherein said reflector is a mirror.

42. The apparatus of claim 37 wherein said reflector is a light-reflective plastic.

43. The apparatus of claim 37 wherein the light reflected from said reflector is directed toward said liquid-crystal display panel at an angle generally normal to said liquid-crystal display.

44. The apparatus of claim 37 wherein said diffuser comprises a flexible light diffuser material.

45. The apparatus of claim 37 wherein said diffuser comprises a plastic geometric diffuser material.

46. The apparatus of claim 37 wherein said diffuser comprises a woven fiber optic diffuser material.

47. The apparatus of claim 37 wherein said diffuser comprises a fluorescent material.

48. The apparatus of claim 37 wherein said diffuser comprises a phosphorescent material.

49. The apparatus of claim 37 further comprising a light filtering disposed upon said liquid-crystal display for providing color balance to the light produced by said at least one flashlamp.

50. The apparatus of claim 37 further comprising a digitizing screen layer disposed upon said liquid-crystal display.

51. The apparatus of claim 37 wherein said at least one flashlamp includes a trigger electrode.

52. The apparatus of claim 51 wherein said circuit comprises:

(a) a DC—DC converter having an output for providing an output voltage to said at least one flashlamp in response to an input voltage from a direct current voltage source, the output voltage being greater than the input voltage;

(b) a resistor having first and second ends, said resistor being electrically connected in series with said DC—DC converter and said at least one flashlamp;

c) a first capacitor shunting the output of said DC—DC converter at the first end of said resistor;

(d) a second capacitor shunting the output of said DC—DC converter at the second end of said resistor;

(e) a drive circuit for providing an impulse voltage to the trigger electrode of said at least one flashlamp wherein said at least one flashlamp produces light when triggered by said drive circuit; and (f) a transformer electrically connected between said drive circuit and said at least one flashlamp.

53. The apparatus of claim 52 wherein the direct current voltage source is a battery.

54. In combination, an apparatus comprising:

(a) a hand-held portable data terminal having a flat panel display; and (b) means disposed within said hand-held portable data terminal for illuminating the flat panel display of said hand-held portable data terminal wherein said illuminating means includes a flashtube, said flashtube containing primarily xenon gas and providing a nearly continuous white, actinic, incoherent light output.

* * * * *